US008501319B2

(12) United States Patent
Leventis et al.

(10) Patent No.: US 8,501,319 B2
(45) Date of Patent: Aug. 6, 2013

(54) PRE-FORMED ASSEMBLIES OF SOLGEL-DERIVED NANOPARTICLES AS 3D SCAFFOLDS FOR COMPOSITES AND AEROGELS

(75) Inventors: Nicholas Leventis, Rolla, MO (US); Chariklia Sotiriou-Leventis, Rolla, MO (US)

(73) Assignee: The Curators of the University of Missouri, University of Missouri System, Office of Technology and Special Projects, Columbia, MO (US)

( * ) Notice: Subject to any disclaimer, the term of this patent is extended or adjusted under 35 U.S.C. 154(b) by 448 days.

(21) Appl. No.: 12/676,129

(22) PCT Filed: Aug. 22, 2008

(86) PCT No.: PCT/US2008/074081
§ 371 (c)(1),
(2), (4) Date: Apr. 30, 2010

(87) PCT Pub. No.: WO2009/032568
PCT Pub. Date: Mar. 12, 2009

(65) Prior Publication Data
US 2010/0310831 A1    Dec. 9, 2010

Related U.S. Application Data

(60) Provisional application No. 60/970,741, filed on Sep. 7, 2007, provisional application No. 60/970,742, filed on Sep. 7, 2007.

(51) Int. Cl.
*B32B 5/16*    (2006.01)
*C01B 33/14*    (2006.01)

(52) U.S. Cl.
USPC ............ 428/403; 423/338; 428/407; 516/100

(58) Field of Classification Search
CPC .................................. B32B 5/16; C01B 33/14
USPC ................................................. 428/403–407
See application file for complete search history.

(56) References Cited

U.S. PATENT DOCUMENTS

| | | | | |
|---|---|---|---|---|
| 5,468,477 A | * | 11/1995 | Kumar et al. | 424/78.17 |
| 5,523,365 A | * | 6/1996 | Geck et al. | 526/194 |
| 5,605,983 A | * | 2/1997 | Dauth et al. | 525/479 |
| 6,994,964 B1 | * | 2/2006 | Chang et al. | 435/6.11 |
| 7,732,496 B1 | * | 6/2010 | Leventis et al. | 516/99 |

OTHER PUBLICATIONS

Leventis, Three-Dimensional Core-shell superstructures: mechanically strong aerogels, Acc. Chem. Res. (2007), 40, 874-884.*

\* cited by examiner

*Primary Examiner* — Hoa (Holly) Le
(74) *Attorney, Agent, or Firm* — Carr LLP

(57) ABSTRACT

A composite material that includes a dopant comprised of pre-formed, three dimensional assemblies of skeletal structures that are comprised of solgel derived nanoparticles. The composite material includes a chemically bonded, in situ formed, polymer coating that at least partially coats mesoporous surfaces of the nanoparticles to provide enhancement of random dispersion of the dopant and to minimize or avoid agglomeration. Further, the polymer may be functionalized or the mesoporous surfaces of the nanoparticles may be treated to enable stronger chemical bonding between the dopant and the polymer.

25 Claims, 12 Drawing Sheets

Stress strain data of neat PMMA ($\rho_b$ = 1.15 g cm$^{-3}$) and of silica/PMMA matrix composites ($\rho_b$ = 1.17 g cm$^{-3}$; sample dimensions: length 200 mm; diameter; 20 mm).

13C NMR spectrum in DMSO-d6 of the reaction mixture of BTDA and APTES

Preparation of polyimide crosslinked aerogels

Table 1. Density data for polyimide aerogels

| Material | Diameter (cm) | Bulk density, $\rho_b$ (g/cc) | Skeletal density, $\rho_s$ (g/cc) |
|---|---|---|---|
| ABM-PI 2:2:1 | 1.716 ± 0.002 | 0.234 ± 0.003 | 1.659 ± 0.004 |
| ABM-PI 2:3:2 | 1.318 ± 0.003 | 0.481 ± 0.002 | 1.656 ± 0.003 |

Note: 20 mm inner diameter molds were used.

C CPMAS NMR spectra of polymide crosslinked areogels

Si CPMAS NMR spectra of polyimide crosslinked areogels

TGA curves for the polyimide crosslinked aerogels of this study

Table 2 Structural properties of polyimide aerogels

| Sample | $S_{BET}$ (m²/g) | Pore Volume (cc/g) | Pore Size (nm) |
|---|---|---|---|
| ABM-PI 2:2:1 | 493.90 | 3.52 | 28.58 |
| ABM-PI 2:3:2 | 530.30 | 1.58 | 11.96 |

FIG. 14

Table 1. Recipe for making Si-AIBN gels with "100% silica"

| | Vial A | Vial B |
|---|---|---|
| $CH_3OH$ | 4.5 ml (0.1112 moles) | 4.5 ml (0.1112 moles) |
| TMOS | 3.465 ml (0.0234 moles) | 0 |
| $H_2O$ | 0 | 1.5 ml (0.0833 moles) |
| $NH_4OH$ | 0 | 40 μl (0.00029 moles) |
| Silica-AIBN | 0.8961 g (0.00130 moles) | 0 |

Note: $CH_3OH$, HPLC grade supplied by Fisher scientific.

TMOS, 99% supplied by Acros organics.

$H_2O$, deionized.

$NH_4OH$ 29.5% by weight supplied by Fisher Scientific.

Silica-AIBN synthesized in our laboratory [17].

FIG. 15

Table 2. Recipe for making Si-AIBN gels with "50% silica"

| | Vial A | Vial B |
|---|---|---|
| $CH_3OH$ | 4.5 mL (0.1112 moles) | 4.5 mL (0.1112 moles) |
| TMOS | 1.732 mL (0.00117 moles) | 0 |
| $H_2O$ | 0 | 1.5 mL (0.0833 moles) |
| $NH_4OH$ | 0 | 40 μL (0.00029 moles) |
| Silica-AIBN | 0.4480 g (0.00065 moles) | 0 |

*Synthesis of PMMA filled silica-AIBN monolith termed "25% silica":*
*(PMMA/Si-25%Si)*

Table 3. Recipe for making Si-AIBN gels with "25% silica"

|  | Vial A | Vial B |
|---|---|---|
| CH$_3$OH | 4.5 mL (0.1112 moles) | 4.5 ml (0.1112 moles) |
| TMOS | 0.866 mL (0.00585 moles) | 0 |
| H$_2$O | 0 | 1.5 mL (0.0833 moles) |
| NH$_4$OH | 0 | 40 µL (0.00029 moles) |
| Silica-AIBN | 0.224 g (.000325 moles) | 0 |

|  | Vial A | Vial B |
|---|---|---|
| CH$_3$OH | 4.5 mL (0.1112 moles) | 4.5 mL (0.1112 moles) |
| TMOS | 3.465 mL (0.0234 moles) | 0 |
| H$_2$O | 0 | 1.5 mL (0.0833 moles) |
| NH$_4$OH | 0 | 40 µL (0.000297 moles) |

Note: CH$_3$OH, HPLC grade supplied by Fisher scientific.

TMOS, 99% supplied by Acros organics.

H$_2$O, deionized

NH$_4$OH 29.5% by weight supplied by Fisher Scientific

FT-IR spectra of silica-PMMA composites

Thermal decomposition of silica-PMMA composites

Compressive stress-strain curves for neat PMMA and silica-PMMA composites

PRE-FORMED ASSEMBLIES OF SOLGEL-DERIVED NANOPARTICLES AS 3D SCAFFOLDS FOR COMPOSITES AND AEROGELS

CROSS-REFERENCE TO RELATED APPLICATIONS

This application relates to, and claims the benefit of the filing date of, U.S. provisional patent application Ser. No. 60/970,741 entitled POLYMER NANO-ENCAPSULATED ACID-CATALYZED SOL-GEL MESOPOROUS SILICA MONOLITHS, filed Sep. 7, 2007, and U.S. provisional patent application Ser. No. 60/970,742 entitled BIDENTATE GEL CROSSLINKERS MATERIALS AND METHODS FOR MAKING AND USING THE SAME, filed Sep. 7, 2007, the entire contents of which are incorporated herein by reference for all purposes.

STATEMENT REGARDING FEDERALLY SPONSORED RESEARCH OR DEVELOPMENT

This invention was made with Government support under 0653919 awarded by the National Science Foundation. The Government has certain rights in this invention.

BACKGROUND OF THE TECHNOLOGY

1. Field of the Technology

The technology relates to composite materials, and methods of making these, that include a filler or dopant material, and more especially relates to composite materials that include therein a dispersion of pre-formed, 3D assemblies of nanoparticles.

2. Description of the Related Art

Generally, composite materials include two main components: a polymer and at least one filler material that is either embedded within a matrix of the polymer or that is at least coated with the polymer. The polymer is often an organic polymer, commonly referred to as a "plastic." The filler material may be selected to produce a composite material with desired physical properties. The filler may have any of a variety of shapes and sizes depending upon the desired nature of the composite. In addition, composite materials may include other components that impart desired properties, such as color, resistance to ultraviolet radiation, or another desirable trait.

Gels are one of a variety of composite materials and gels may include nanoparticle fillers, or "dopants," as they are called in the aerogel arts. Nanoparticle fillers or dopants may be of any shape, but the major dimension is generally in the size range from about 1 to about 100 nm. From a materials perspective, nanotechnology furnishes composite materials with useful macroscopic properties by manipulating matter in the about 1 to about 100 nm size range. Aerogels are open-cell foams, often derived from drying of wet gels by processes such as supercritical fluid drying processes. Quasi-stable, ultra-low density, three-dimensional assemblies of nanoparticles are referred to as aerogels. The large internal void space of an aerogel is responsible for its low dielectric constant, low thermal conductivity and high acoustic impedance. At the same time, aerogels are generally fragile and impractical for physical high load applications.

In the case of nanoparticle fillers, uniform dispersion throughout the composite material is a desirable goal to provide the composite material with consistent physical properties. Uniform dispersion of nanoparticles presents challenges in practice. These challenges arise from a variety of factors, including, for example, agitation and mixing processes, but also from the differences in physical properties between the nanoparticles and the polymer material, such as density, and properties of the nanoparticles that lead to particle agglomeration.

In general, two issues that often interfere with achieving optimal composite materials performance relate to the non-uniform dispersion ("agglomeration") of nanoparticles in the polymer and lack of adequate compatibility between the nanoparticles and the polymer. Agglomeration may be so severe as to effectively cancel the advantage of using nano-sized particles because the agglomerates formed may be beyond the nano size range. Lack of materials compatibility, on the other hand, may introduce a discontinuity at the polymer/filler interface where composite failure may initiate when it is deployed in ordinary use.

To date, efforts to address nanoparticle agglomeration generally focused on the use of surfactants that maintain nanoparticle dispersion in the matrix during composite production. Overall, the criterion for success is whether there is any enhancement of the physical properties of the resultant composite beyond what would be obtained by simply mixing nanoparticles into the matrix through agitation, or other mechanical means.

SUMMARY OF THE TECHNOLOGY

An exemplary embodiment provides a composite material having a dopant that includes pre-formed, three dimensional assemblies of skeletal structures that are comprised of nanoparticles and a polymer coating that at least partially coats mesoporous surfaces of the nanoparticles. The coated composite material may be prepared in situ along with the silica aerogel.

Another exemplary embodiment provides a composite material that includes pre-formed, three dimensional assemblies of skeletal structures. The skeletal structures are comprised of nanoparticles, and mesoporous spaces. The assemblies are substantially uniformly dispersed within the composite material. Further, a polymerized-in-place ("in situ") polymer coating at least partially coats mesoporous surfaces of the nanoparticles.

A further aspect a composite material has pre-formed, three dimensional assemblies of skeletal structures that are comprised of nanoparticles, and mesoporous spaces. The nanoparticles are derived using the sol-gel method, and the assemblies are substantially uniformly dispersed within the composite material. Further, a polymer coating at least partially coats and adheres to mesoporous surfaces of the nanoparticles. The adherence may be promoted by a chemical bonding agent.

BRIEF DESCRIPTION OF THE DRAWINGS

The following illustrative diagrams are not to scale, and are intended to facilitate an understanding of the invention. The diagrams do not limit the scope of the invention, which is demarcated solely in the claims here below.

FIG. 14 is a Table providing a recipe for PMMA/Si aerogels, of Example C.

FIG. 15 is a Table providing a recipe for 50% silica, PMMA/Si aerogels, of Example C.

DETAILED DESCRIPTION OF EXEMPLARY EMBODIMENTS

Figure 1:
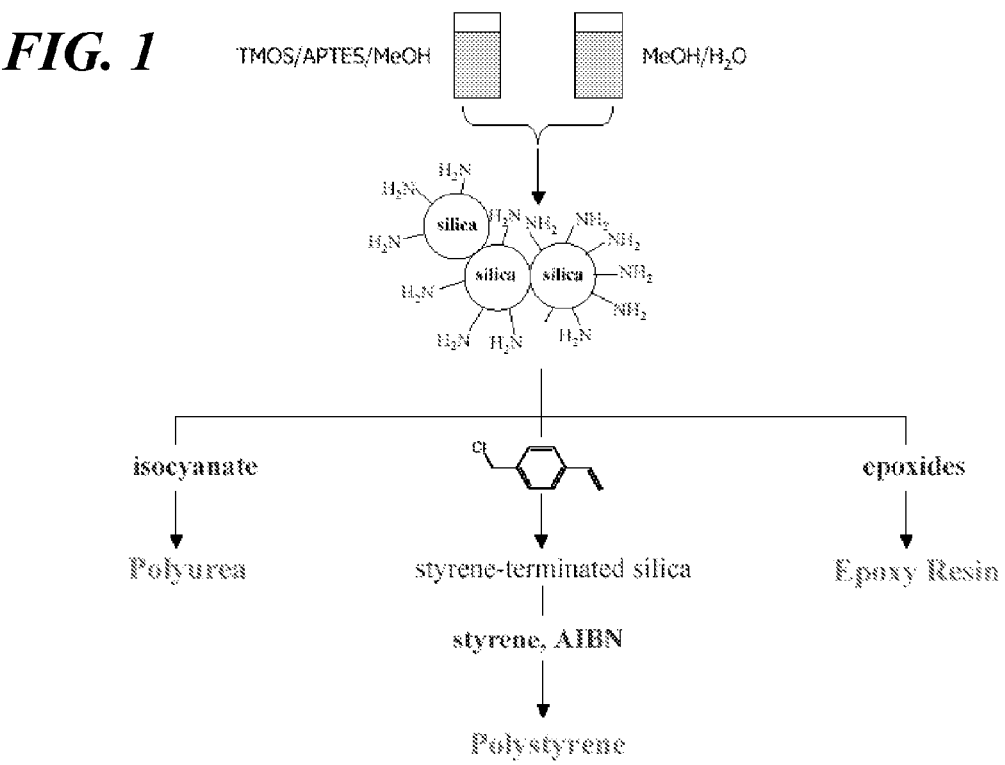
FIG. 1 is a schematic illustration of a process scheme for attaching functional groups to silica.

Historically, self-supporting three dimensional ("3D") dispersions of nanoparticles with a high percent (i.e. more than about 70-80%) content of interstitial empty space between them has been referred to as "aerogels." However, aerogels are often fragile. This fragility has limited their use to specialized environments.

While nanoparticles fillers may be of any of a wide range of materials, an exemplary embodiment of nanoparticle fillers includes silica [$SiO_2$]. This exemplary embodiment is non-limiting of the present technology, but is among the most common dopants in use as a filler in plastics and will be used as an illustrative example. Silica, when derived through a base-catalyzed sol-gel process, includes interconnected strings of nanoparticles ("nanoparticle skeletal structures") randomly dispersed spatially such that there is often more than about 99% empty mesoporous space or void space within the nanoparticle network.

A major issue faced by those making matrix-nanoparticle composites is agglomeration of the nanoparticles, so that ultimately the dopant is microparticulate rather than nanoparticulate. To keep the nanoparticles apart, prior efforts have included using surfactants. However, surfactants introduce contact issues between dopant and matrix.

Breaking from such an approach, the present inventors discovered that the agglomeration issue can be resolved by pre-dispersing the dopant in 3D. Such form of dopant can be, for example, sol-gel derived silica. That silica can be surface-modified so that it can develop chemical bonding with a polymer matrix, by for example, covalent or other bonding, such that the randomly distributed dopant becomes a single chemical continuum with the matrix.

To form this material, a sol-gel chemistry process can be used to form wet gels. Nanoscopically, such gels consist of strands of nanoparticles randomly distributed in 3D. Then, the pore-filling solvent is exchanged with monomer precursors able to develop chemical bonding (covalent, or ionic, or otherwise) with the surface of silica. Subsequently, the monomer is polymerized in situ, forming a polymer, which fills the space between the strands completely or substantially completely.

The resulting material has some very unique properties. First, it maintains an unusual transparency at relatively high levels of doping. Second, it demonstrates a mechanical behavior that is different from that of the pristine material.

In accordance with exemplary embodiments, there are presented pre-formed, sol-gel derived, random distributions of three dimensional ("3D") assemblies (or "scaffolds") of nanoparticles that are effective as dopants for composite materials and aerogels in particular. The random distribution of these pre-formed 3D distributions is formed by the in situ coating nanoparticle skeletal structures with a suitable polymer at critical weak points of the skeletal structure. An exemplary embodiment includes a conformal coating of the polymer on nanoparticle skeletal structures. The coating both configures the nanoparticulates relative to each other in a 3D structure and also strengthens the structure by reinforcing weak-link points. Thus, the polymer coating produces strengthened, pre-formed 3D assemblies of nanoparticles that may be randomly distributed throughout the composite material. The pre-formed, random distributions of 3D assemblies of nanoparticles substantially eliminate or reduce the agglomeration and non-uniform distribution of nanoparticles thereby providing improved composite physical properties. The strengthening polymer may be selected from a variety of suitable, chemically compatible polymers, such as for example, without limitation: polyimide, polymethylmethacrylate, polystyrene and other polylefins, epoxy, polyurethane, and polyurea.

In another aspect, the nanoparticles may be functionalized with a suitable chemical that promotes chemical bonding with the polymer. The functionality-assisted chemical bonding may be of any kind, such as covalent bonding, ionic bonding, or through van der Waal's forces. The chemical bonding substantially strengthens the 3D assemblies thereby enabling the production of stronger, less fragile, aerogels at the expense of minimal, if any, increase in aerogel density.

According to an aspect, the particle surfaces ("mesoporous surfaces") that interface with the mesoporous space are functionalized with chemical groups capable of chemical bonding with a polymer. The polymer is formed from monomers that were introduced in the mesoporous space. The extent to which the mesoporous space is filled with monomers provides the possibility for extensive customizing of the resultant composite through its polymer content. For example, one may use sufficient monomers to only deposit a thin conformal polymer layer in the mesoporous spaces of the nanoparticle network, or one may add enough monomers to form sufficient polymer to fill the mesoporous space completely, or one may add an intermediate amount of monomers. Thus, at the extremes are two distinct composite materials with differing physical properties. The first composite material with only a conformal polymer coating may emphasize the physical properties deriving from its higher porosity: lightweight, low thermal conductivity and dielectric constants, and high acoustic impedance. The second kind of composite material, derived from maximizing monomer addition, may be expected to be heavier, with higher thermal conductivity and dielectric constants as well as lower acoustic impedance. The second composite material poses the issue of nanoparticle dispersion as well as the issue of bonding between matrix and dopant.

According to another embodiment of the present technology, the aerogel fragility problem that may be traced to fragile inter-particle necks within the solgel-derived particulate skeletal framework is addressed by forming a conformal polymer coating on the skeletal framework that connects and chemically bridges the nanoparticles, to reinforce the weak inter-particle necks and thereby strengthen the 3D structure, with minimal increase in density. That process of bridging and reinforcing is referred to as "cross linking" and it produces a less fragile, more robust aerogel. Thus, through polymer cross linking, the high porosity (or low density) of the aerogel and the desired material properties derived from its high porosity (or low density) are preserved. The new, stronger aerogel materials provided that include random distributions of 3D assemblies of nanoparticles are referred to as "polymer crosslinked aerogels."

According to an exemplary embodiment, the aerogel fragility problem is addressed by casting a thin conformal polymer coating over the entire internal porous surface of the skeletal nanostructure. The coating chemically connects skeletal nanoparticles and widens inter-particle necks. Thus, the internal void space is not compromised significantly, while the flexural strength of a typical monolith of pre-formed 3D assemblies is increased by about 2× to about 400× for a nominal increase in density of about 10% to about 400%.

In another exemplary embodiment, there is provided a chemistry that allows in situ linking or bonding a variety of polymers to the surfaces of silica nanoparticles that form 3D assemblies of nanoparticles. According to this embodiment, a coupling agent that has a first functionality capable of bonding to nanoparticle surfaces and a second functionality, compatible with the polymer and/or able to bond with the polymer, is utilized to improve the polymer-nanoparticle bond. Examples of such coupling agents include the group of silanes and modified silanes so that they provide dangling amines, olefins, carboxylic acids and free radical initiators.

In an exemplary embodiment of a process illustrated in FIG. 1, an amine functionality may be added to the silica nanoparticle surfaces by co-gelation of tetramethoxysilane (TMOS) with 3-aminopropyltriethoxysilane (APTES). Cross linking may then be carried out by reaction with a suitable cross linking reagent, including but not limited to: isocyanates, epoxies, or even styrene, which proceeds by reaction of surface dangling amines with p-chloromethylstyrene.

Figure 2:
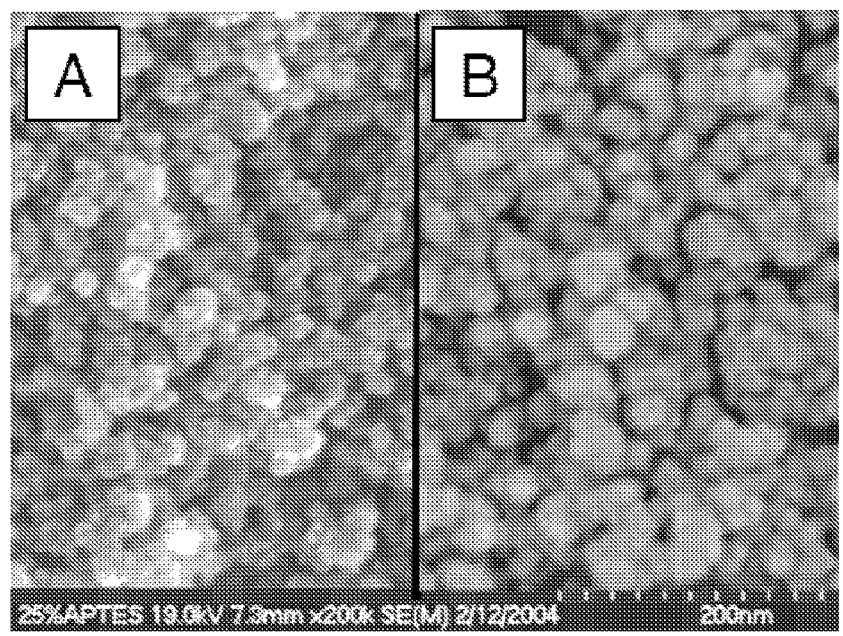
FIG. 2 is pair of SEM photomicrographs wherein A illustrates a typical amine-modified aerogel while micrograph B illustrates the same aerogel after crosslinking with polystyrene in accordance with an exemplary embodiment.

FIG. 2A illustrates a typical amine-modified silica aerogel while FIG. 2B illustrates the same aerogel after crosslinking with polystyrene, according to an exemplary embodiment. The secondary particles are clearly visible in FIG. 2B, while the fine definition of the primary particles has been erased by the conformal polymer layer. These materials demonstrate exceptional specific mechanical properties (strength, modulus, energy absorption).

In a modification of the process of FIG. 1, shown in FIG. 3, skeletal nanoparticles are modified with free radical initiators by co-gelation of TMOS with the bidentate free radical initiator shown below as compound 1, wherein the variables k and k' may be in the range of 1-4, the variable m and m' may be in the range of 2-6, and the variables n and n' may be in the range of 2-4, or shown below as compound 1A:

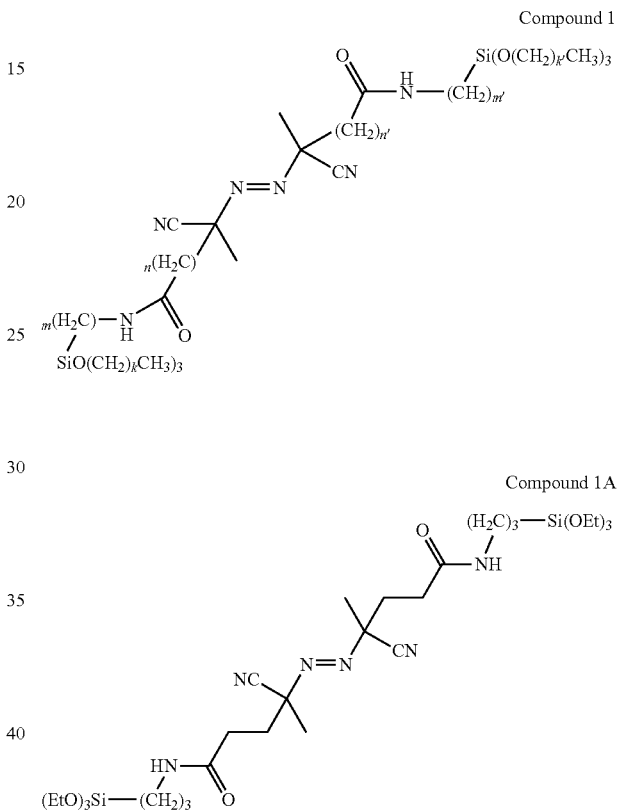

Compound 1

Compound 1A

Compound 1, above, decomposes thermally, producing two surface-bound radicals that initiate polymerization of a monomer (methylmethacrylate-MMA- in this exemplary embodiment) in the mesoporous spaces to form polymethylmethacrylate ("PMMA"). Depending on the amount and concentration of the MMA monomer in the mesoporous spaces, the resultant polymer will either form a conformal coating suitable to produce a polymer crosslinked aerogel, or the resultant polymer will form a polymer matrix suitable to produce a nanoparticle-filled composite.

Figure 4:
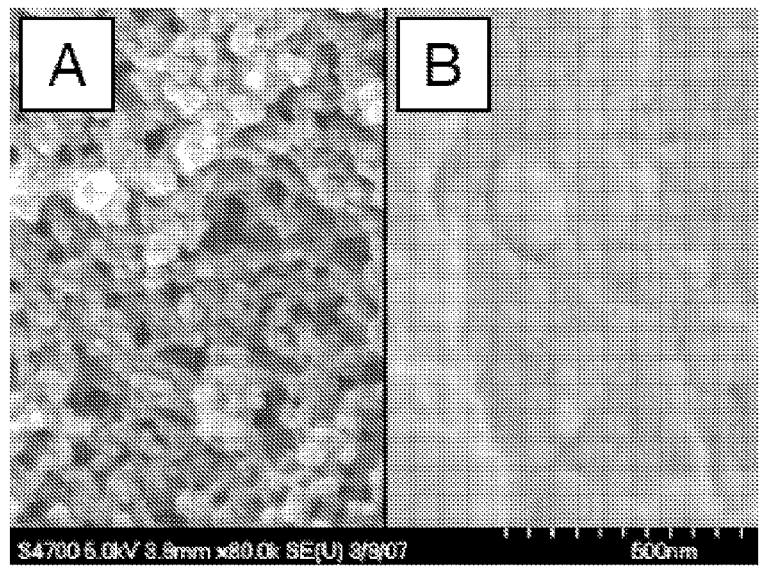
FIG. 4 is a pair of SEM photomicrographs wherein A shows a silica aerogel crosslinked with PMMA and with porosity, while B shows the aerogel porosity filled with PMMA formed in situ from MMA.

FIG. 4 illustrates the microscopic difference between a polymer crosslinked aerogel and the polymer matrix composite material. The porosity visible in FIG. 4A has been filled in with polymer in FIG. 4B.

Figure 5:
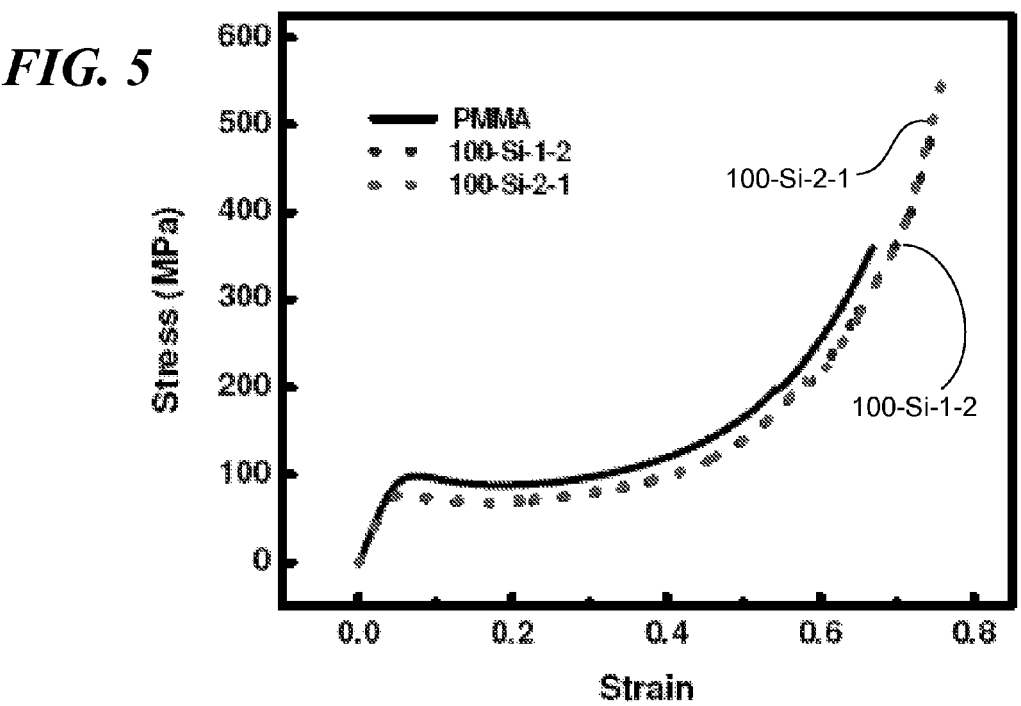
FIG. 5 is a graph illustrating stress vs. strain of neat PMMA polymer and of a silica/PMMA gel, in accordance with an exemplary embodiment.

The behavior under compression of neat PMMA and various silica/PMMA composites is shown in FIG. 5. Based on the density of the materials, we conclude that silica/PMMA composites still include pores (the densities of neat PMMA and of silica/PMMA composite are about equal). Nevertheless, despite that residual porosity, the modulus and yield strength of silica/PMMA are close to those of neat PMMA, but the ductility of silica/PMMA is clearly better. Under compression, pellets of both materials show barreling but neat PMMA develops cracks and fails while the composite stays together as one piece. Accordingly, it is theorized, without being bound, that randomly distributed nanoparticulates silica, covalently bonded to the polymer, helps keep the silica/PMMA material together.

The following examples illustrate exemplary embodiments of the technology and do not limit the scope of the technology as disclosed herein and claimed here below.

EXAMPLES

Example A

Figure 3:
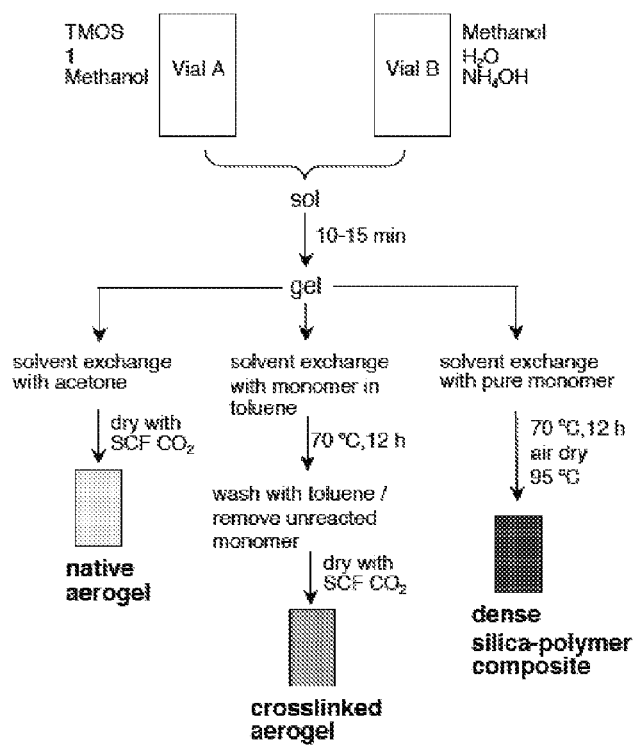
FIG. 3 is a schematic illustration of a process flow diagram and indicates the relationship between native aerogel, crosslinked aerogel, and silica-polymer composite.

Wet gels incorporating compound 1, above, were prepared as described in Leventis et al, C Polymer Preprints, 2007, 48, 950-951, the process of which is summarized in FIG. 3. The wet gels were then either dried using supercritical fluid (SCF) $CO_2$ to native aerogels, or they were solvent exchanged with a 1:1 (v/v) uninhibited MMA:toluene monomer solution, followed by heating at 70° C. for 12 h, solvent exchange with toluene and SCF $CO_2$ drying to yield crosslinked aerogels.

In order to obtain silica/PMMA matrix composites, wet gels made with 20 mL of sol in 25 mL syringe molds (syringes from Fisher Scientific, CAT no. 14-817-32, 25 mL, 20 mm inner diameter) were solvent-exchanged with inhibitor-free MMA (5 washes, 100 mL of wash solution each time) in glass jars (from Fisher Scientific, catalogue number 06-414-1A). An interval of 24 h was allowed between washings, with frequent agitation. Finally, gels were heated in the last MMA bath at 70° C. for 12 h. At the end of the 12 h period, MMA surrounding each gel became viscous while the gel was enclosed in a shell of PMMA that extends beyond the original geometric gel boundaries. The monolith was removed from the viscous liquid, air dried on the hood floor for 24 h and subsequently it was heated at 95° C. to complete polymerization.

FIG. 3 summarizes the preparation processes outlined above, and significantly, it emphasizes the relationship between the three kinds of materials discussed here. The sol-gel 3D network of nanoparticles, in accordance with exemplary embodiments, comprises the common denominator of all three.

Example B

The present example illustrates the production of crosslinked silica aerogels having chemically bonded silica and polyimides. Two types of polyimide-silica hybrid aerogels, ABM-PI 2:2:1 and ABM-PI 2:3:2, were synthesized by combining a sol-gel process with a silica surface-bound polyamic acid formation process, followed by heating in order to turn the polyamic acid into a polyimide covalently bonded to the silica surface. The hybrid aerogels were prepared by using a silane, in this example, 3-aminopropyltriethoxysilane (APTES), endcapped polyamic acid and tetramethoxysilane (TMOS) as silica precursors.

To make the polyamic acid compatible with the sol, to avoid unnecessary side reactions and to chemically link polyimide on the sol-gel skeletal nanoparticles, the polyamic acid was formulated with end-caps of 3-aminopropyltriethoxysilane. Such end-caps are able to participate in sol-gel reactions with TMOS. This results in highly crosslinked three-dimensional networks with covalently bonded silica and polyimide moieties. In this study, silica/polyimide hybrid aerogels with two different mole ratios of 3,3',4,4'-benzophenonetetracarboxylic dianhydride (BTDA) and methylene dianiline (MDA) were prepared. APTES was used as an endcapping agent in both cases. The mole ratios used were 2:2:1 and 2:3:2 (APTES:BTDA:MDA), and the resulting gels are named ABM-PI 2:2:1 and ABM-PI 2:3:2, respectively. Changing the mole ratios of BTDA and MDA changes the length of the polyimide tethers. The resulting aerogels were studied by a variety of methods.

Conclusions:

Polyimide crosslinked aerogels were successfully prepared by in situ polymerization of APTES endcapped polyamic acid by the sol-gel route. TGA suggests that the two materials have good thermal stability. SEM indicates that ABM-PI 2:2:1 aerogels have a more open pore structure in comparison to ABM-PI 2:3:2. The skeletal densities of these hybrid aerogels are in the range of 1.60 to 1.68 g/cc. The BET surface area studies suggest that the ABM-PI 2:3:2 aerogels have a higher surface area than the ABM-PI 2:2:1 aerogels. Nitrogen adsorption isotherms confirm the mesoporous structure of both types of polyimide crosslinked aerogels. The prepared aerogels have polyimide coated silica nanoparticles. The presence of polyimide increases the thermal stability of the composite, while silica acts as filler which makes the composites cost-effective. The polyimide aerogels might be obtained in desired shapes and they have potential applications for manufacture of equipment requiring high thermal stability.

Materials.

3,3',4,4'-Benzophenonetetracarboxylic dianhydride (BTDA, high purity, Chriskev Company) was dried under vacuum for 24 h at 160° C. before use. Methylene dianiline (MDA, 97%, Acros) was dried under vacuum at room temperature for 24 h. 3-Aminopropyltriethoxysilane (APTES, 99%, Acros), tetramethoxysilane (TMOS, 99%, Acros), 1-methyl 2-pyrollidinone (NMP, 99%, Aldrich), aqueous ammonia ($NH_4OH$, 28%, Aldrich) were used as received.

Reaction of BTDA and APTES.

Figure 6:
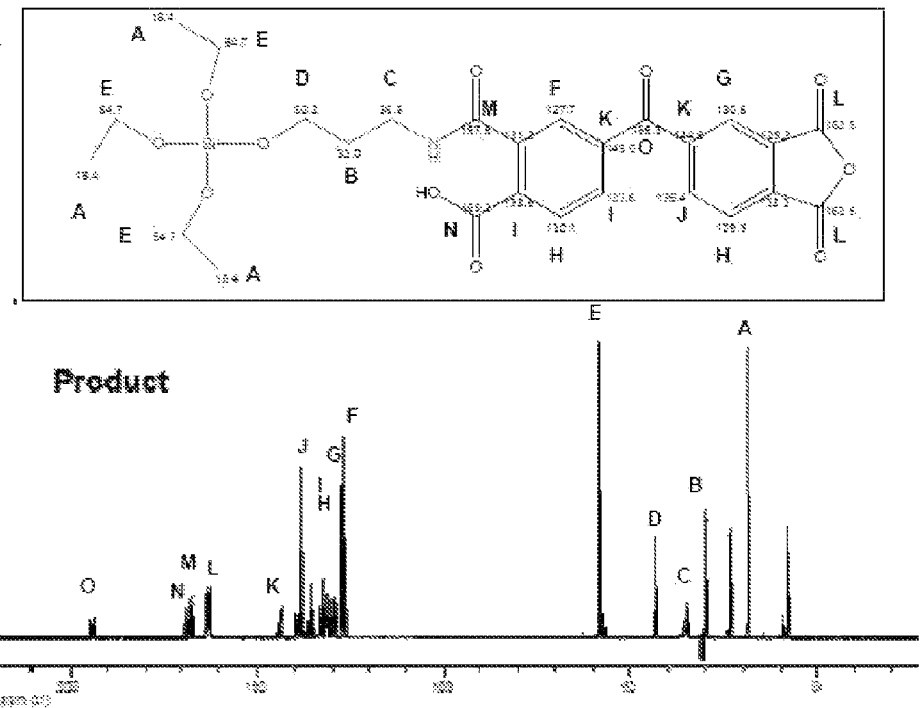
FIG. 6 is an NMR spectral output of a BTDA and APTES mixture of Example B and a diagram of the chemical structure of the BTDA and APTES keyed to the NMR spectral output.

The $^{13}C$ NMR spectra of the BTDA and APTES reaction mixture is illustrated in FIG. 6. The spectra were obtained immediately after mixing of BTDA and APTES in equimolar amount. It was observed that the reaction happens almost instantaneously at room temperature.

Preparation of Polyimide Crosslinked Aerogels.

Figure 7:
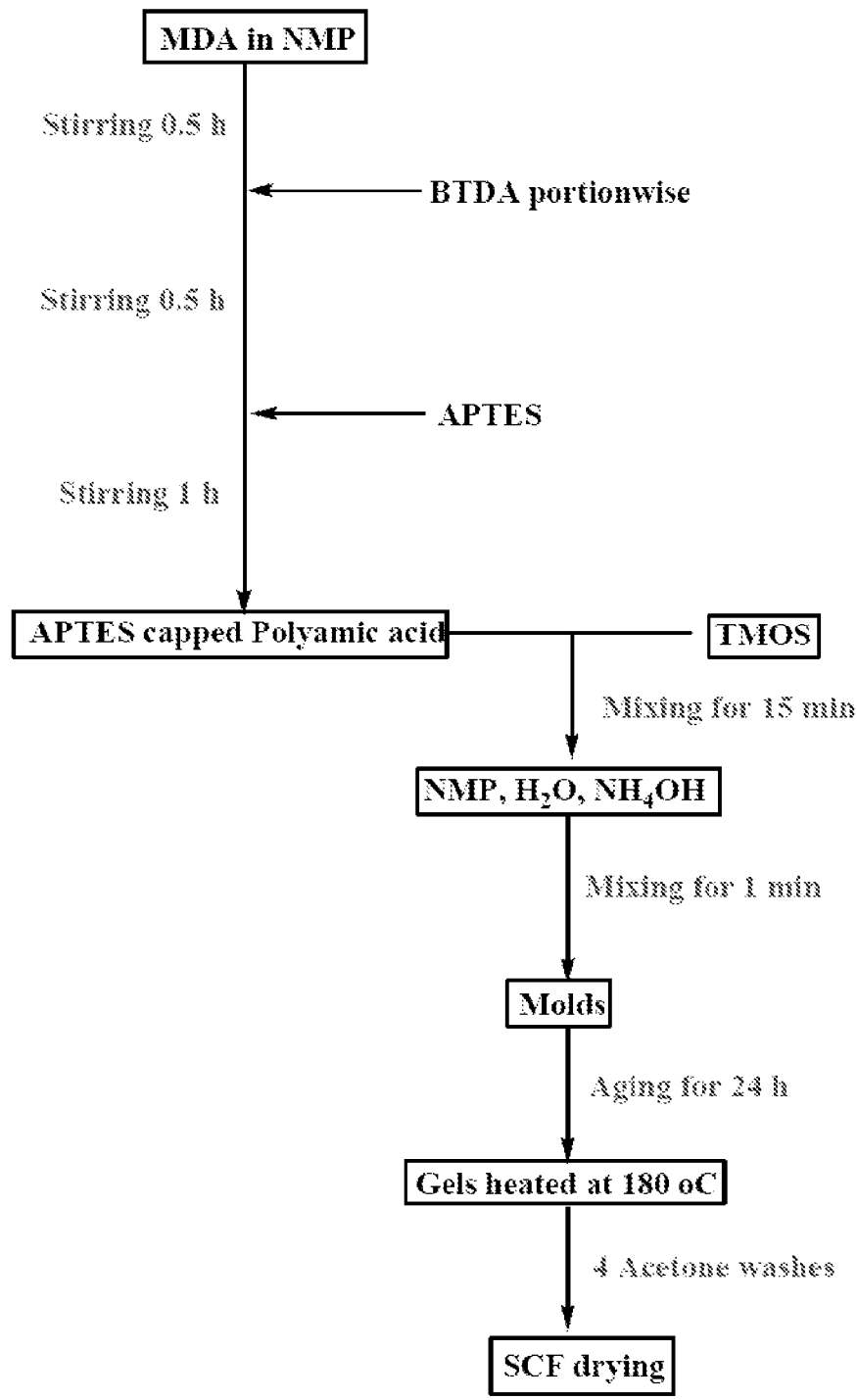
FIG. 7 is a schematic process flow diagram for the preparation of polyimide aerogels of Example B.

The flowchart for preparation of polyimide aerogels is illustrated in FIG. 7. ABM-PI 2:2:1 and ABM-PI 2:3:2 aerogels were synthesized similarly, while the only difference was the mole ratios of BTDA and MDA. MDA was dissolved in 50 mL NMP. BTDA was added portion wise to the resultant solution over a period of 30 min under continuous stirring. Once a clear yellow solution of the polyamic acid was obtained, APTES was added and the solution was stirred for 1 h. This yields polyamic acid capped on both ends with APTES. To this silica/polyamic acid solution, TMOS was added and stirred continuously for 15 min. The sol was cooled in an ice bath. A solution of NMP, water and aqueous ammonia was prepared separately and was added to the silica/polyamic acid solution.

The molar ratio of water and the alkoxy functional group of TMOS and APTES were kept at 1:1. The mixture was stirred for 1 min and transferred into plastic molds having 20 mm internal diameter. The gelation took place in 3-5 min; the gels were aged in their molds for 24 h. After aging, gels were removed from their molds and were transferred to glass vials just able to contain the gels. The gels are covered with NMP and the vials with the gels covered with NMP are heated in a closed bottle at 180° C. for 24 h. At the end of the period gels were removed from the vials and were solvent-exchanged with acetone by washing for four times in 8 h intervals. The gels were then dried using supercritical fluid (SCF) $CO_2$ to afford polyimide crosslinked aerogels.

Characterization.

The aerogels were characterized for skeletal density on a Micromeritics AccupycII 1340 pycnometer. Bulk densities were calculated from the weight and physical dimensions of the samples. The mid IR spectra of the prepared polyimide crosslinked aerogels were recorded with NICOLET NEXUS 470 FT-IR. The SEM micrographs were taken with a HITACHI S 4700 FE-SEM which is a field emission type microscope. Thermogravimetric analysis (TGA) was carried out under air flow using a NETZSCH STA 409C/CD thermogravimetric analyzer. The BET surface area was measured using a Quantachrome Autosorb-1 Surface Area/Pore Distribution Analyzer. Solid state NMR was carried out on a Bruker Avance 300 Spectrometer.

Density Data.

The bulk density and skeletal density data are presented in Table 1. The bulk density of ABM-PI 2:3:2 is higher than that for ABM-PI 2:2:1. On the other hand, the skeletal density of ABM-PI 2:2:1 is higher than that of ABM-PI 2:3:2 as expected from the formulation for the relative silica and polymer content. The porosity of the samples is calculated from the bulk and skeletal density data according to eq. 2 and the results are also included in FIG. 8, Table 1.

$$\Pi = \frac{(1/\rho_b - 1/\rho_s)}{1/\rho_b} \times 100\% \quad (2)$$

FT-IR Spectroscopy.

Figures 8, 9:
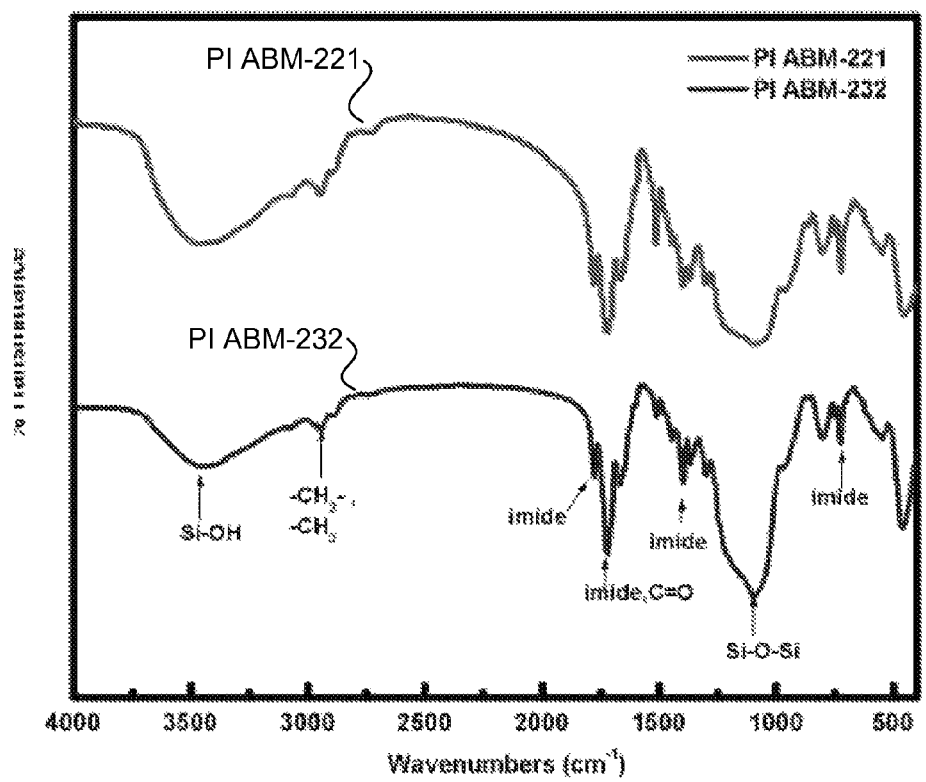
FIG. 8 is a Table showing density data for two aerogels, in Example B.
FIG. 9 is an FITR spectrum of polyimde crosslinked gels according to Example B.
Figure 10:
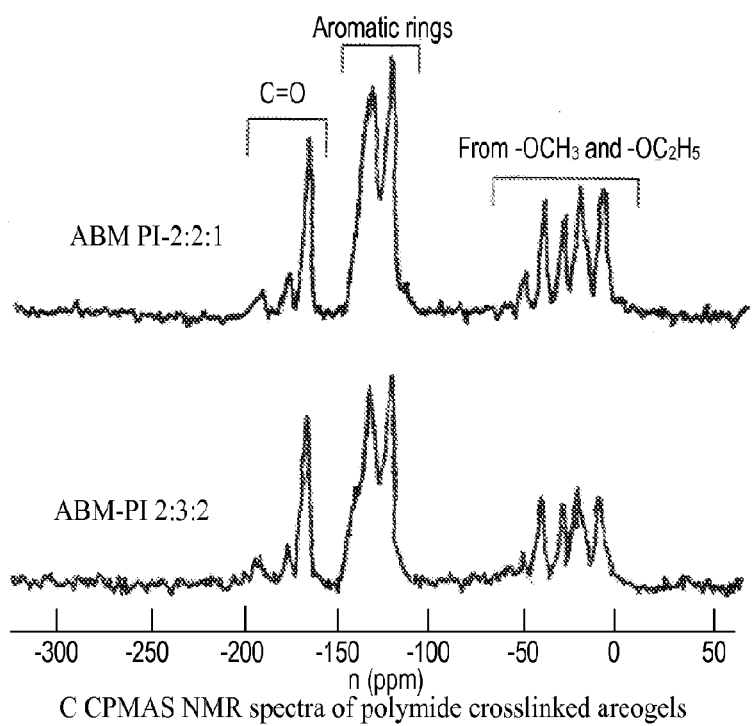
FIG. 10 shows a $^{13}C$ NMR spectra of the polyimide crosslinked gels of Example B.

FIG. 9 shows the FTIR spectra of prepared polyimide crosslinked aerogels 2:2:1 and 2:3:2 (APTES:BTDA: MDA). The characteristic absorption bands of the imide group are observed at 727, 1378, 1728 and 1776 cm-1 for both samples is shown in FIG. 10. The absorption band between 1000-1100 cm-1 is for the three dimensional Si—O—Si network in the aerogels. The absorptions in the range 3200-3700 cm-1 are assigned to Si—OH formed as a result of the hydrolysis of alkoxy species. This band is dominant in the ABM-PI 2:2:1 type and smaller in the ABM-PI 2:3:2 type of aerogels. This is due to the relative difference in the quantities of silica and polyimide in these aerogels.

Solid State NMR.

Figure 11:
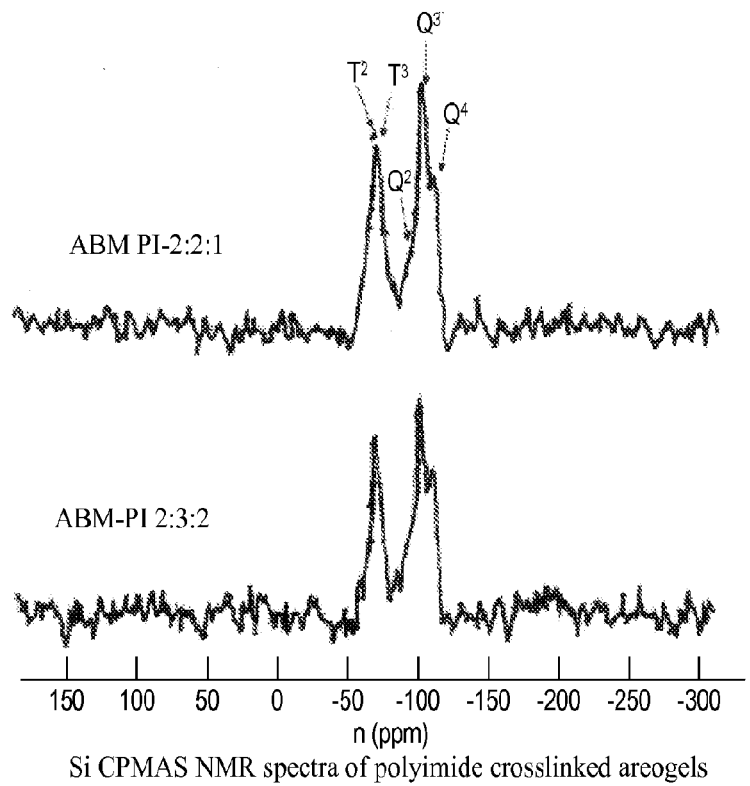
FIG. 11 shows a $^{29}Si$ NMR spectra of the polyimide crosslinked gels of Example B.

FIG. 10 shows the $^{13}C$ CPMAS NMR spectra of the polyimide crosslinked aerogels. The $^{13}C$ CPMAS NMR spectra show resonances due to residual methoxy and ethoxy groups between 0-50 ppm. The resonances from the aromatic rings from BTDA and MDA are observed between 100-150 ppm. Three different carbonyl peaks were observed. The peaks at 167 and 168 ppm correspond to the carbons joining the nitrogen of the imide. The peak at 194 corresponds to the carbonyl bridge of BTDA. FIG. 11 shows the $^{29}Si$ CPMAS NMR spectra of the polyimide crosslinked aerogels. The $^{29}Si$ CPMAS NMR suggests the covalent nature of bonding between the silica and polyimide. The resonances in the range of −125 to −75 ppm are assigned to $Q^4$ (−105 ppm), $Q^3$ (−95 ppm) and $Q^2$ (−85 ppm) silicon atoms from TMOS. This indicates that the silicon atoms form four, three and two Si—O—Si bridges, respectively. The silicon atoms from APTES are linked through two or three Si—O—Si bridges. This is evident from the $T^3$ and $T^2$ silicon observed at −60 and −59 ppm, respectively.

Scanning Electron Microscopy.

FE-SEM micrographs were taken of the two types of polyimide crosslinked aerogels of this study. It can be estimated from the micrographs that the silica particles are in the range of 15-20 nm in both types of aerogels. It can also be observed that the ABM-PI 2:2:1 type aerogels have a more porous structure of the two in agreement with results shown in Table 2.1.

Thermogravimetric Analysis.

Figures 12, 13:
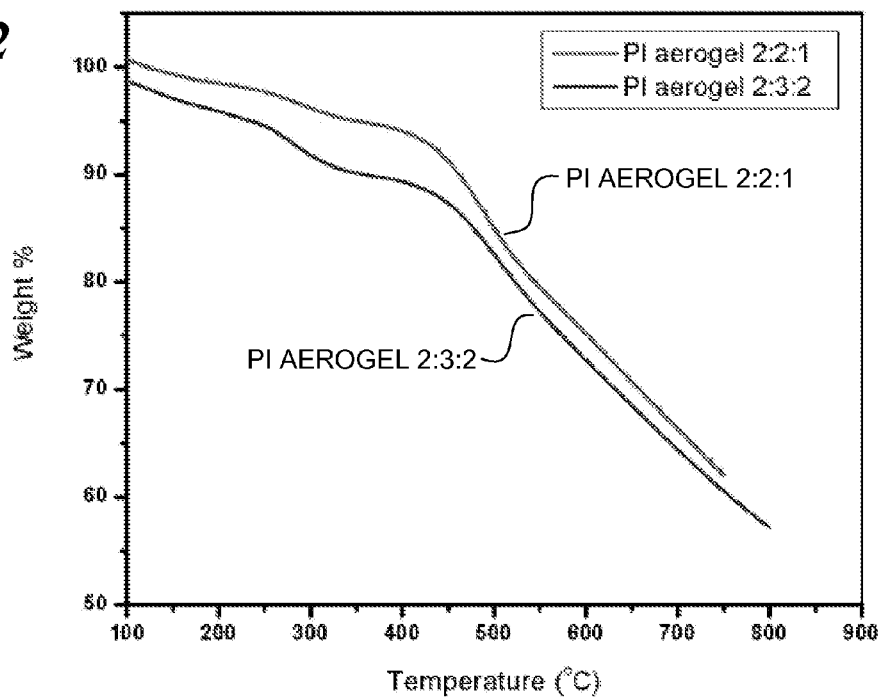
FIG. 12 illustrates the TGA data for polyimide crosslinked aerogels of Example B.
FIG. 13 is a Table summarizing the nitrogen sorption porosity for polyimide crosslinked aerogels of Example B.

FIG. 12 illustrates the TGA data for the polyimide crosslinked aerogels of this study at a heating rate of 20° C./min under nitrogen flow. The thermal decomposition temperature for both types of aerogels is higher than 450° C.

Nitrogen Sorption Porosimetry.

BET surface area was measured for each of the aerogels. The shape of the BET isotherm for each of the samples is characteristic for a mesoporous material with a Type IV isotherm and a H1 hysteresis loop. FIG. 13, Table 2, summarizes results for both types of polyimide aerogels. The 2:3:2 type of polyimide aerogel has higher surface area than the 2:2:1 type. On the other hand, the ABM-PI 2:2:1 aerogels have higher pore volume and pore size than the ABM-PI 2:3:2 type.

Example C

Monolithic and dense composites of poly(methylmethacrylate) and silica were prepared either by direct polymerization in the mesoporous void space of silica gels or by dispersing silica in particulate form in the monomer undergoing polymerization. In situ bulk polymerization using a surface bound derivative of 2,2'-azobis(isobutyronitrile) called "silica-AIBN" was carried out in all cases. However, our focus is on our novel method of preparing silica-PMMA composites by circumventing the need for dispersion of silica in MMA. Three types of silica-PMMA composites with varying silica content were prepared by making gels incorporating the "silica-AIBN" initiator and thereafter crosslinking them in MMA to get PMMA-filled silica monoliths. Another type of composite was prepared by conventional mechanical dispersion of silica particles in PMMA pre-polymer remaining after synthesis of the former type of silica-PMMA composites. These two types of composites were compared to neat PMMA, also synthesized in the laboratory using the same PMMA pre-polymer.

Materials.

Methyl methacrylate (MMA) was purchased from Aldrich and was washed with a 5% (w/w) sodium hydroxide solution in water to remove the inhibitor, followed by distillation under reduced pressure. The silica gels were synthesized in lab by base catalyzed sol-gel route. Tetramethoxysilane (TMOS, 99%, Acros), aqueous ammonia ($NH_4OH$, 28%, Aldrich) were used as received. The silane derivative of 2,2"-azobis(isobutyronitrile), silica-AIBN (compound 1) was synthesized in the laboratory. Solvents were obtained from Fisher Scientific.

Conclusions:

Four different silica-PMMA composites were compared to neat PMMA by testing them by various methods. The TGA analyses showed significant improvements in the thermal properties of the silica-PMMA composites. The compressive testing results showed that the composites with 25%, 50% and 100% Si did not vary significantly; the dispersed silica in PMMA sample showed the highest strength followed by neat PMMA.

Preparation of PMMA/Si Composites.

Different types of silica-PMMA composites were made. Syringes (Fisher Scientific, CAT no. 14-817-32, 25 ml, 20 mm inner diameter) were used as molds. The recipe given in the Table of FIG. 14 was scaled up to make 10 gels at a time with a volume of 20 mL each. "100% Silica" are gels obtained from 3.85 mL of silicate (TMOS in this case). Gelation takes place in 5-10 min at room temperature. The gels were aged for 24 h in their molds.

The Si-AIBN gels were washed 5 times with acetone followed by 5 times with toluene. After the last washing with toluene, the gels were washed 5 times with inhibitor-free MMA. Glass jars of 100 mL supplied by Fisher Scientific, USA (catalogue number 06-414-1A) were used as containers for solvent exchange. In all washings, 100 mL of the wash solution was used. An interval of 24 h was given between the washings with occasional agitation. Finally, gels were heated in last MMA bath at 70° C. for 12 h. At the end of the 12 h period, MMA surrounding the gel became a viscous syrup; and the gel was enclosed in a shell of PMMA that extends beyond the original gel boundaries. The monolith was removed from the syrup, dried in the open air on the hood floor for 24 h and subsequently it was heated at 95° C. to complete the polymerization. The viscous syrup surrounding each monolith was saved for making other composites.

Synthesis of PMMA filled silica-AIBN monolith termed "50% silica": (PMMA/Si-50% Si). The PMMA/Si-50% Si composites were prepared by using the "Silica AIBN" gels made as per the recipe given in the Table of FIG. 15. The gels were further processed as described earlier.

Synthesis of PMMA filled silica-AIBN monolith termed "25% silica": (PMMA/Si-25% Si). The PMMA/Si-25% Si composites were prepared by using the "Silica AIBN" gels made as per the recipe given in the Table of FIG. 16. The gels were further processed as described earlier.

Preparation of Neat PMMA.

Figures 16, 17:
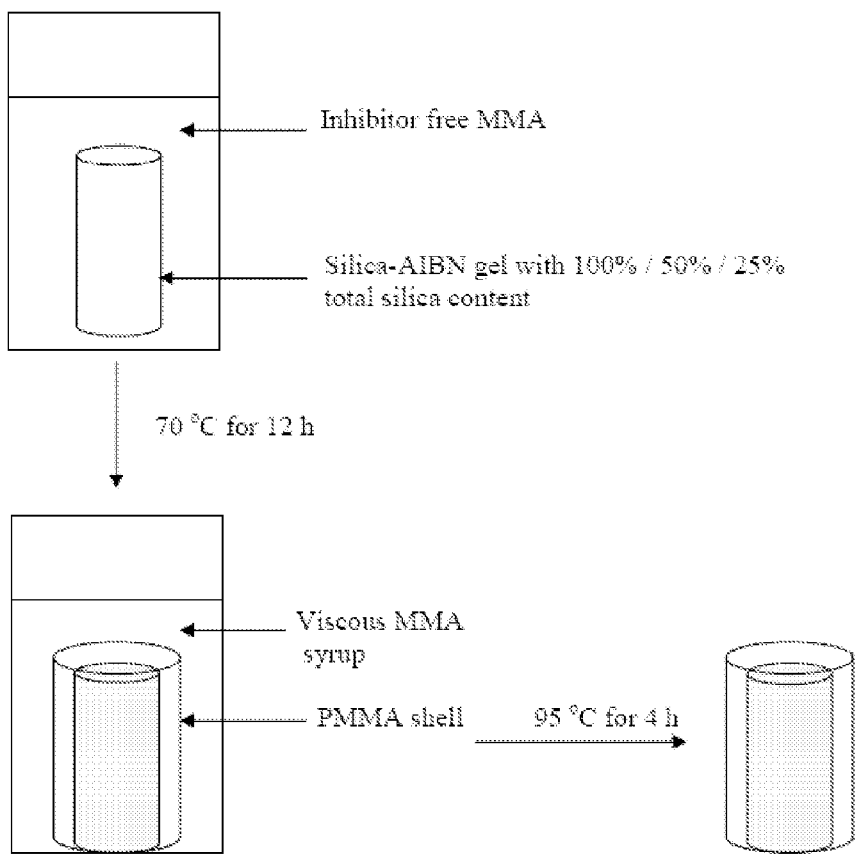
FIG. 16 is a Table providing a recipe for 25% silica, PMMA/Si aerogels, of Example C.
FIG. 17 illustrates process steps for preparing neat PMMA, in Example C.

The neat PMMA monoliths were prepared according to the steps given in FIG. 17. Several experiments were done to obtain PMMA monoliths. One approach was to heat the inhibitor-free MMA with AIBN (0.5, 0.29, 0.1, 0.05, 0.01 wt %) for 1 h at 70° C. Bubble formation was noted, probably due to decomposition of AIBN. Another approach was to make a pre-polymer by heating MMA and AIBN (0.5, 0.29, 0.1, 0.05, 0.01 wt %) at 90° C. for 10 min. The viscous pre-polymer was then heated at 70° C. A similar problem of bubbling was observed. As a third approach, inhibitor-free MMA was heated by itself to 130° C. for inducing thermal polymerization. Again bubbling was observed, this time probably due to boiling of MMA. The neat PMMA composites were prepared by heating the syrup obtained after synthesis of 100% Si composites. The syrup was heated for 48 h in 30 mL glass vial with 24.20 mm inner diameter at 70° C. The lids were tightly closed during heating at 70° C. Once a rubbery polymer was formed, the uncapped vials with the polymer inside were heated in tightly capped jars at 95° C. for 4 h to complete polymerization and hardening. This rendered clear, homogenous PMMA monoliths, which were obtained by breaking their glass molds.

Preparation of PMMA Composites with Dispersed Silica Particles.

Figures 18, 19:
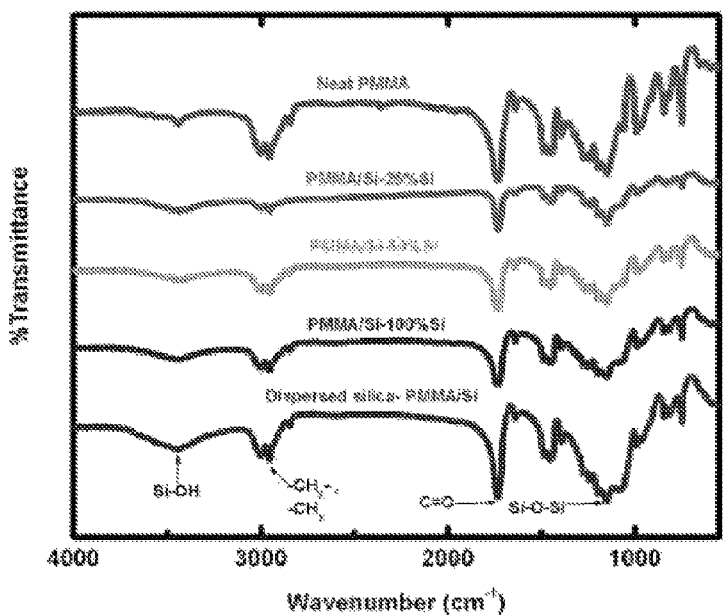
FIG. 18 is a Table providing a recipe for making PMMA composites with dispersion of silica nanoparticles, of Example C.
FIG. 19 illustrates FTIR spectra of the silica-PMMA composites of Example C.

The recipe given in the Table 4 of FIG. 18 was scaled up to make ten gels with a volume of 20 mL each. The molds used for making those gels were 25 mL syringes with an inner diameter of 20 mm, supplied by FisherSci, USA. Gelation takes place in 5-10 min at room temperature. The gels were aged in their molds at room temperature for 24 h and washed 4 times with acetone at an interval of 24 h for each wash. Finally, gels were dried supercritically. The bulk density of the resulting aerogels was found out to be 0.234±0.002 g/cc (average density of 5 aerogels) and they were crushed to fine powder in a SPEX 8000D Mixer/Mill supplied by SPEX Certiprep Group. The MMA-syrup obtained after synthesis of "100% Si" composites was mixed with the silica fine powder.

The total volume of the fine powder and MMA was kept at 20 mL. Vials (30 mL) with 24 mm inner diameter were used as molds. The mass of the fine powder used was equal to the mass of one silica aerogel, which was 2.391±0.034 g (average mass of 5 aerogels). The MMA-syrup and the silica fine powder were mixed by shaking vigorously on a vortex mixer for effective wetting and dispersion. Subsequently, the resulting dispersion was heated at 75° C. in tightly closed vial for 48 h. The polymer was heated in the open mold placed in a tightly capped 100 mL jar at 95° C. for 4 h in a 100 mL tightly capped glass jar to complete polymerization.

Sample Preparation and Characterization.

The neat PMMA and silica PMMA composites were crushed to fine powder using a SPEX 8000D Mixer/Mill. Mid IR spectra of the prepared polyimide crosslinked aerogels were recorded on a NICOLET NEXUS 470 FT-IR by using KBr pellets. Bulk densities were calculated from the weight and physical dimensions of the samples. Thermogravimetric analysis (TGA) was carried out under air flow using a NETZSCH STA 409C/CD thermogravimetric analyzer. Solid state NMR was carried out on a Bruker Avance 300 Spectrometer using magic angle spinning.

FT-IR Spectroscopy.

The chemical structures of the prepared silica-PMMA composites were characterized with FT-IR spectroscopy as shown in FIG. 19. The characteristic peaks of the stretching vibration bands of the C=O and C—H bonds in the PMMA segment at 1730 and 2950 $cm^{-1}$ were observed. The characteristic vibration for Si—OH was observed in the range 3400-3500 $cm^{-1}$.

Solid State NMR.

Figure 20:
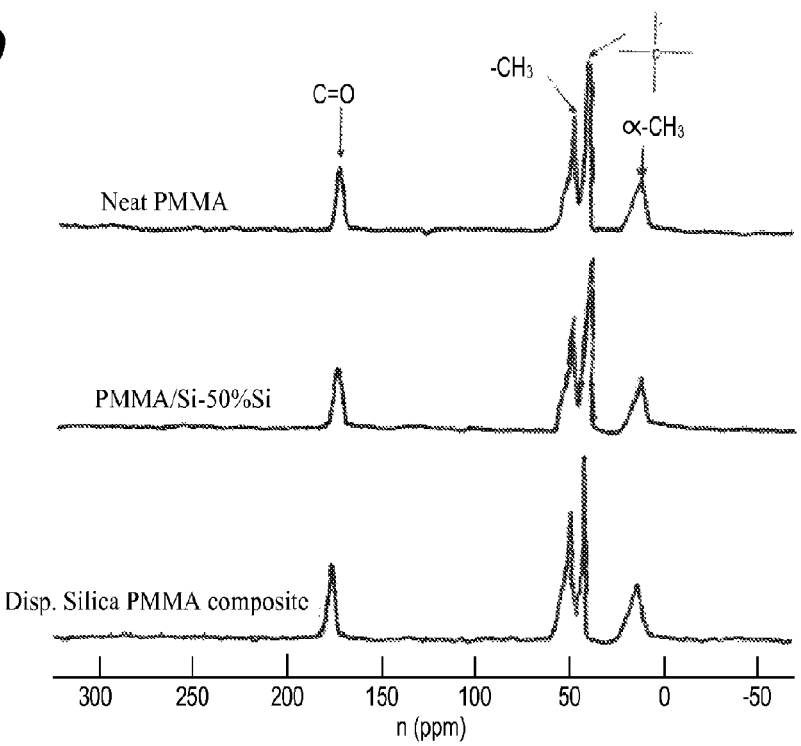
FIG. 20 illustrates the $^{13}C$ NMR spectra of the silica-PMMA composites of Example C.

The results of $^{13}C$ CPMAS NMR spectroscopy are illustrated in FIG. 20. The resonances for carbon of the α-methyl group are seen at 15 ppm. A sharp peak for the quaternary carbon is seen at 45 ppm. The resonances for the carbon of the methyl group are observed at 55 ppm. The peak for the carbonyl of PMMA is observed at 177 ppm.

Thermogravimetric Analysis.

Figure 21:
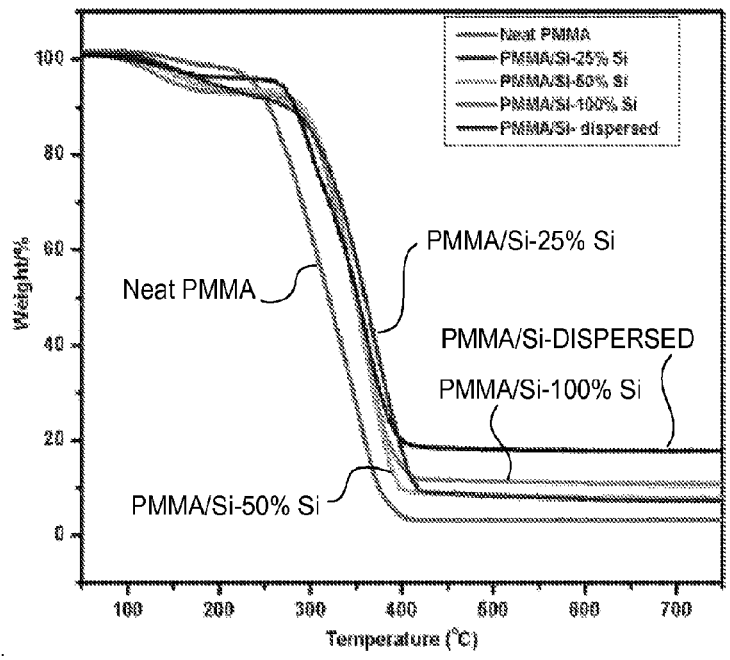
FIG. 21 is an illustration of the TGA graphs of neat PMMA and silica-PMMA of Example C.

The TGA curves of neat PMMA and silica-PMMA composites tested under the flow of nitrogen are shown in FIG. 21. Three thermal decomposition stages for the neat PMMA and the composites can be found from these TGA curves. The first two decomposition steps correspond to the cleavage of head-to-head linkages and end-initiated vinyl-terminated PMMA. The third step of the thermal decomposition curve corresponds to the random scission of PMMA main chains. The decomposition temperature increases considerably when silica is incorporated in the PMMA. The thermal decomposition temperature for the silica-PMMA composites is about 300° C. as opposed to 250° C. for neat PMMA. It was observed that the 50% silica-PMMA composites gave the highest thermal stability closely followed by the 100%, 25% and dispersed silica composites.

Density and Mechanical Testing.

Figure 22:
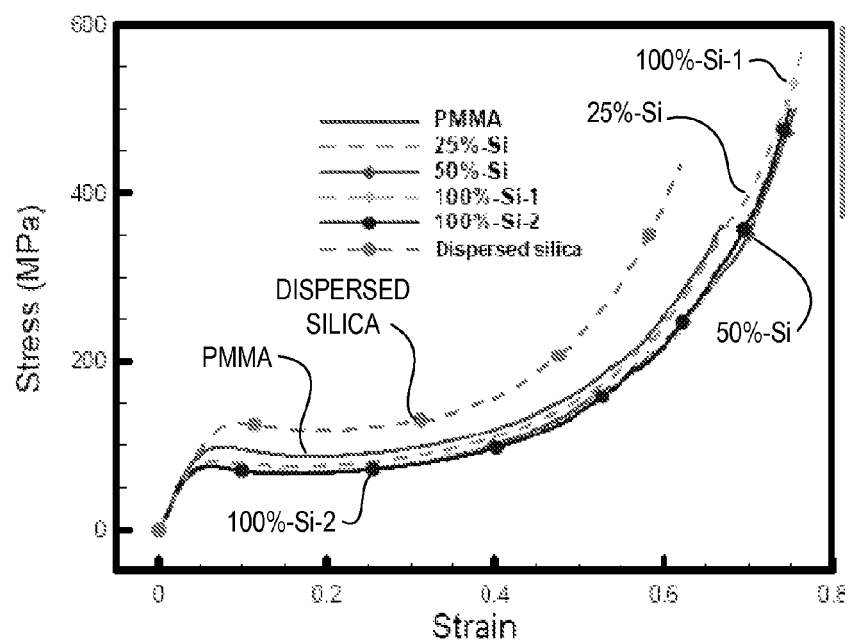
FIG. 22 illustrates compressive stress vs. strain for the silica-PMMA composites and neat PMMA, of Example C.

Uniaxial compression tests were performed on a MTS 810 Servo Hydraulic test system. FIG. 22 shows the compressive stress strain curves for the silica-PMMA composite. A strain rate of 0.01 $s^{-1}$ was used in all the cases. The density data and compressive testing results are given in Table 5. It was found that the strength of the composites with 25%, 50% and 100% silica did not vary significantly; the dispersed silica in PMMA sample showed the highest strength followed by neat PMMA.

One of skill in the art will readily appreciate the scope of the invention from the foregoing and the claims here below, and that the invention includes all disclosed embodiments, modifications of these that are obvious to a person of skill in the art, and the equivalents of all embodiments and modifications, as defined by law.

The invention claimed is:
1. A composite material, comprising:
pre-formed, three dimensional assemblies of skeletal structures comprising nanoparticles having mesoporous surfaces, said skeletal structures comprising mesoporous spaces; and
a polymerized-in-place polymer coating at least partially coating the mesoporous surfaces of the nanoparticles;
wherein the polymer coating at least substantially fills the mesoporous spaces of said skeletal structures.

2. The composite material of claim 1, wherein the polymer coating comprises a conformal coating.

3. The composite material of claim 1, wherein the three dimensional assemblies are formed by chemical modification of skeletal structures in a co-gelation process of tetramethoxysilane and a bidentate free radical initiator.

4. The composite material of claim 3, wherein the three dimensional assemblies are formed by chemical modification of skeletal structures in a co-gelation process of tetramethoxysilane and a bidentate free radical initiator, wherein the bidentate free radical initiator is of the formula:

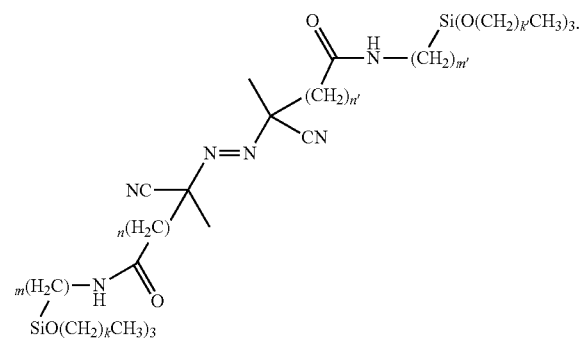

5. The composite material of claim 4, wherein the assemblies of skeletal structures are predispersed within a polymer matrix.

6. The composite material of claim 3, wherein the three dimensional assemblies are formed by chemical modification of skeletal structures in a co-gelation process of tetramethoxysilane and a bidentate free radical initiator, wherein the bidentate free radical initiator is of the formula:

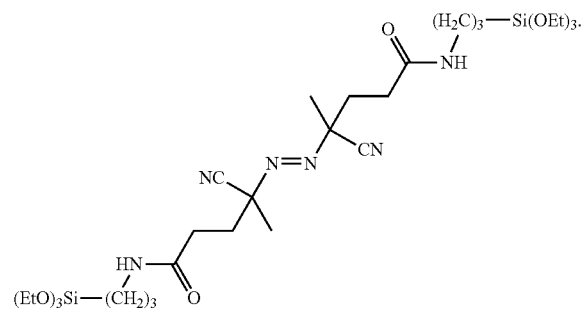

7. The composite material of claim 1, further comprising a chemical coupling agent forming a bridge between the polymer coating and mesoporous surfaces of the nanoparticles.

8. The composite material of claim 7, wherein the coupling agent comprises a silane.

9. The composite material of claim 1, wherein the flexural strength of a monolith of the composite material comprising skeletal structures having the polymer coating is about 300 times greater than a second composite material having a skeletal structure of nanoparticles lacking the polymer coating and the density of the composite material is less than about 4 times that of the second composite material.

10. A composite material comprising:
pre-formed, three dimensional assemblies of skeletal structures comprising nanoparticles having mesoporous surfaces, said skeletal structures comprising mesoporous spaces, the assemblies substantially uniformly dispersed within the composite material; and
a polymerized-in-place polymer coating at least partially coating the mesoporous surfaces of the nanoparticles, and at least substantially filling the mesoporous spaces of said skeletal structures.

11. The composite material of claim 10, wherein the skeletal structures comprises an aerogel.

12. The composite material of claim 10, wherein the polymer coating comprises a conformal polymer coating.

13. The composite material of claim 10, further comprising a chemical coupling agent forming a bridge between the polymer coating and mesoporous surfaces of the nanoparticles.

14. The composite material of claim 13, wherein the coupling agent comprises a silane.

15. The composite material of claim 10, wherein the skeletal structures comprise silica.

16. The composite material of claim 15 wherein the skeletal structures are formed in a sol gel process.

17. The composite material of claim 16, wherein the polymer is selected from polyimide, polymethylmethacrylate, polystyrene and other polyolefins, epoxy, polyurethane, polyurea.

18. The composite material of claim 10, wherein the flexural strength of the aerogel having the polymer coating is about 300 times greater than a second aerogel lacking the polymerized-in-place polymer coating, and the density of the aerogel less than about 4 times that of the second aerogel.

19. The composite material of claim 10, wherein the polymer is selected from polyimide, polymethylmethacrylate, polystyrene and other polylefins, epoxy, polyurethane, and polyurea.

20. A composite material comprising:
pre-formed, three dimensional assemblies of skeletal structures comprising nanoparticles having mesoporous surfaces, said skeletal structures comprising mesoporous spaces, the nanoparticles derived from solgel, the assemblies substantially uniformly dispersed with the composite material; and
a polymerized-in-place polymer coating at least partially coating and adhered to mesoporous surfaces of the nanoparticles, the polymer coating adherence to the mesoporous surfaces being enhanced by chemical bonding;
wherein the polymer coating at least substantially fills the mesoporous spaces of said skeletal structures.

21. The composite material of claim 20, further comprising a chemical coupling agent forming a bridge between the polymer coating and mesoporous surfaces of the nanoparticles.

22. The composite material of claim 20, wherein the flexural strength of the aerogel having the polymerized-in-place polymer coating is about 300 times greater than a second aerogel lacking the polymerized-in-place polymer coating and the density of the aerogel is less than 3 times that of the second aerogel.

23. The composite material of claim 20, wherein the polymer coating comprises a conformal polymer coating.

24. A composite material having a silica dopant comprised of a 3D assembly of skeletal structures comprised of sol-gel derived nanoparticles having mesoporous surfaces, said skeletal structures comprising mesoporous spaces, wherein the silica has been surface-modified to form a chemical bond with an in situ-formed polymer matrix, the polymer matrix forming a chemical continuum with the dopant, wherein the polymer matrix forms a polymer coating, and wherein the polymer coating at least substantially fills the mesoporous spaces of said skeletal structures.

25. A method of manufacturing a composite material having a silica dopant comprised of a 3D assembly of skeletal structures comprised of sol-gel derived nanoparticles having mesoporous surfaces, the skeletal structures having mesoporous spaces, the method comprising:

forming wet gels substantially comprised of strands of nanoparticles distributed in said 3D skeletal structures comprising mesoporous spaces, the nanoparticles derived from a silica dopant by means of a sol-gel process, exchanging pore-filling solvent with monomer precursors able to develop chemical bonding with the surface of silica, and polymerizing the monomer to form a polymer coating which at least substantially fills the space between the strands of nanoparticles and the mesoporous spaces of said skeletal structures.

* * * * *